(12) United States Patent
Hedtke et al.

(10) Patent No.: US 8,776,608 B2
(45) Date of Patent: Jul. 15, 2014

(54) COPLANAR PROCESS FLUID PRESSURE SENSOR MODULE

(75) Inventors: Robert C. Hedtke, Young America, MN (US); David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 354 days.

(21) Appl. No.: 13/285,775

(22) Filed: Oct. 31, 2011

(65) Prior Publication Data
US 2013/0104663 A1 May 2, 2013

(51) Int. Cl.
*G01L 13/02* (2006.01)
(52) U.S. Cl.
USPC .................................. 73/756; 73/716; 73/717
(58) Field of Classification Search
USPC ..................... 73/715, 716, 717, 756
See application file for complete search history.

(56) References Cited

U.S. PATENT DOCUMENTS

| | | | | |
|---|---|---|---|---|
| 4,315,431 A | * | 2/1982 | Hawk | 73/203 |
| 4,315,432 A | * | 2/1982 | Newton | 73/431 |
| 4,499,773 A | * | 2/1985 | Crampton et al. | 73/718 |
| 4,833,922 A | * | 5/1989 | Frick et al. | 73/756 |
| 5,051,937 A | * | 9/1991 | Kawate et al. | 702/104 |
| 5,343,757 A | * | 9/1994 | Tate | 73/724 |
| 5,524,492 A | * | 6/1996 | Frick et al. | 73/706 |
| 5,554,809 A | * | 9/1996 | Tobita et al. | 73/700 |
| 5,656,782 A | * | 8/1997 | Powell et al. | 73/756 |
| 6,131,467 A | * | 10/2000 | Miyano et al. | 73/756 |
| 6,511,337 B1 | * | 1/2003 | Fandrey et al. | 439/320 |
| 6,609,427 B1 | * | 8/2003 | Westfield et al. | 73/753 |
| 6,782,754 B1 | * | 8/2004 | Broden et al. | 73/753 |
| 6,898,980 B2 | * | 5/2005 | Behm et al. | 73/756 |
| 6,901,803 B2 | | 6/2005 | Fandrey | 73/706 |
| 6,907,790 B2 | * | 6/2005 | Orth et al. | 73/753 |
| 7,258,021 B2 | * | 8/2007 | Broden | 73/756 |
| 7,377,176 B1 | | 5/2008 | Broden | 73/753 |
| 7,458,275 B2 | * | 12/2008 | Kleven et al. | 73/756 |
| 7,624,642 B2 | * | 12/2009 | Romo | 73/717 |
| 8,371,175 B2 | * | 2/2013 | Romo | 73/756 |
| 2008/0245158 A1 | | 10/2008 | Hedtke | 73/861.63 |

FOREIGN PATENT DOCUMENTS

| | | | | |
|---|---|---|---|---|
| EP | 919796 A1 | * | 6/1999 | G01L 19/00 |
| JP | 2003294563 A | * | 10/2003 | G01L 19/06 |
| WO | WO 2010141655 A2 | * | 12/2010 | G01L 9/00 |

OTHER PUBLICATIONS

Notification of International Search Report and Written Opinion for the corresponding International patent application No. PCT/US2012/043237 dated Nov. 7, 2012. 9 pages.

* cited by examiner

*Primary Examiner* — Lisa Caputo
*Assistant Examiner* — Punam Roy
(74) *Attorney, Agent, or Firm* — Westman, Champlin & Koehler, P.A.

(57) ABSTRACT

A coplanar process fluid pressure sensor module is provided. The module includes a coplanar base and a housing body. The coplanar base has a pair of process fluid pressure inlets, each having an isolator diaphragm. The housing body is coupled to the coplanar base at an interface between the coplanar base and the housing body. A differential pressure sensor is operably coupled to the pair of process fluid pressure inlets, and is disposed proximate the coplanar base within the housing body.

24 Claims, 4 Drawing Sheets

COPLANAR PROCESS FLUID PRESSURE SENSOR MODULE

BACKGROUND

A process transmitter generally includes a transducer or sensor that responds to a process variable. A process variable generally refers to a chemical or physical state of matter or conversion of energy. Examples of process variables include pressure, temperature, flow, conductivity, pH, and other properties. Pressure is considered to be a basic process variable in that it can be used to measure flow, level, and even temperature.

Pressure transmitters are commonly used in industrial processes to measure and monitor pressures of various industrial process fluids, such as slurries, liquids, vapors, and gases of chemical, pulp, petroleum, gas, pharmaceuticals, food, and other fluid-type processing plants. Differential pressure transmitters generally include a pair of process pressure fluid inputs which are operably coupled to a differential pressure sensor (within the transmitter) that responds to the difference in pressure between the two inputs. Differential pressure transmitters typically include a differential pressure sensor operably coupled to a pair of isolator diaphragms. The isolator diaphragms are positioned at the process fluid inlets and isolate the differential pressure sensor from the harsh process fluids being sensed. Pressure is transferred from the process fluid to the differential pressure sensor through a substantially incompressible fill fluid carried in a passageway extending from the isolator diaphragm to the differential pressure sensor.

Process fluid pressure transmitters are generally coupled to the process via an instrument manifold or flange. One type of arrangement provides an instrument manifold that presents the process fluid pressure inlets in a pair of substantially coplanar ports. One example of such a manifold is sold under the trade designation Model 305 Coplanar™ available from Rosemount Inc., of Chanhassen, Minn. The coplanar design enables flangeless valve integration, and generally provides a compact, light-weight assembly. Moreover, the coplanar design facilitates in-process calibration, and provides substantially fewer possible leak points than conventional non-planar manifold-transmitter assemblies.

A process fluid pressure transmitter is generally considered a field device and that it is able to be mounted in the field. "Field" is generally an external area in a process installation that may be subject to climatological extremes, vibration, changes in humidity, electromagnetic or radiofrequency interface, or other environmental challenges. Thus, the robust physical package of a process fluid pressure transmitter provides the transmitter with the ability to operate in the "field" for extended periods (such as years) at a time.

SUMMARY

A coplanar process fluid pressure sensor module is provided. The module includes a coplanar base and a housing body. The coplanar base has a pair of process fluid pressure inlets, each having an isolator diaphragm. The housing body is coupled to the coplanar base at an interface between the coplanar base and the housing body. A differential pressure sensor is operably coupled to the pair of process fluid pressure inlets, and is disposed proximate the coplanar base within the housing body.

DETAILED DESCRIPTION OF ILLUSTRATIVE EMBODIMENTS

Figure 1:
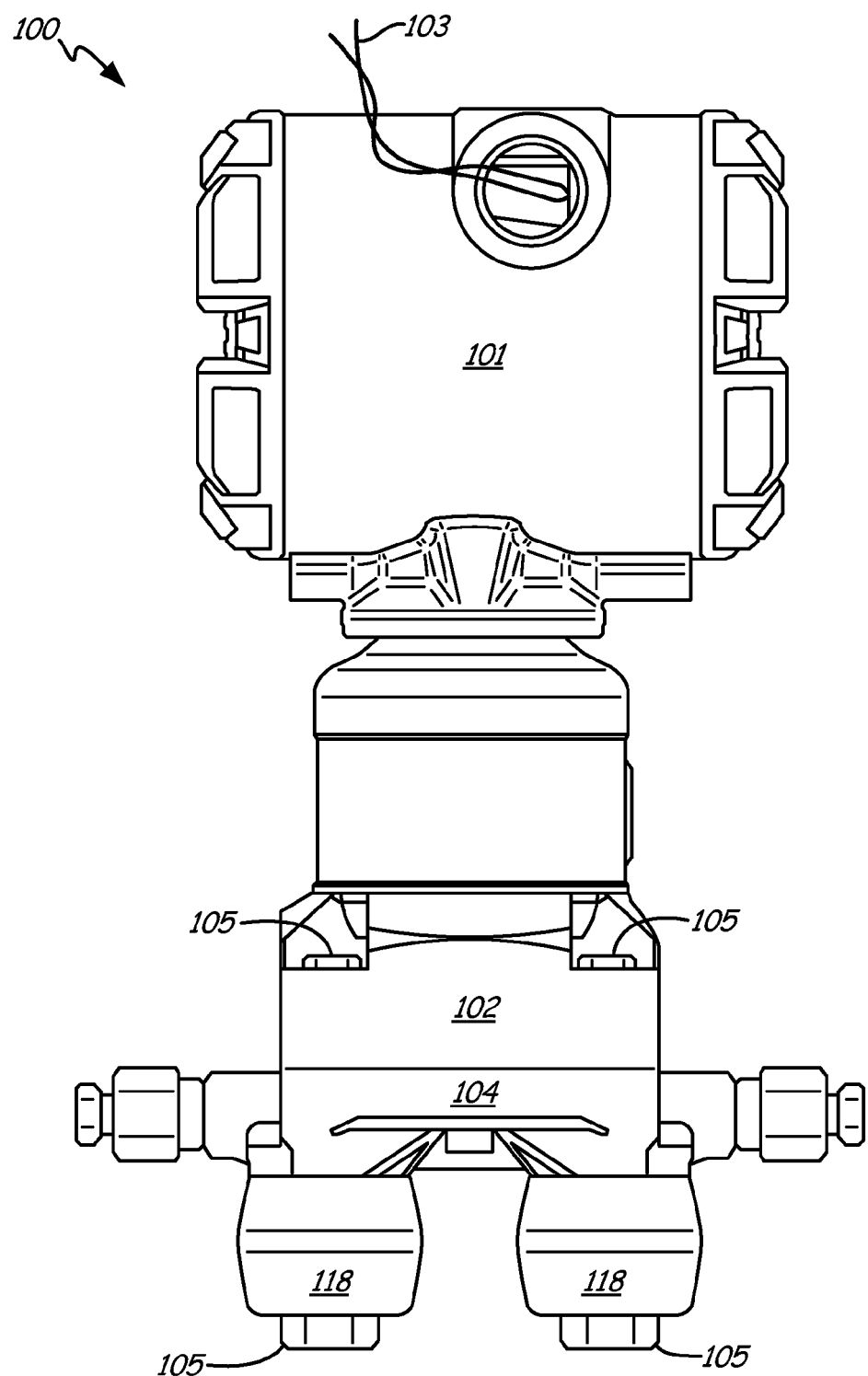
FIG. 1 illustrates a front view of an exemplary PRIOR ART pressure transmitter.

FIG. 1 illustrates a front view of an exemplary PRIOR ART pressure transmitter 100. Pressure transmitter 100 includes an electronics housing 101 that encloses electronic circuitry and a pressure sensor module housing 102 that houses isolator diaphragms, a pressure sensor and associated sensor circuitry. Pressure sensor module housing 102 is bolted to a pressure flange 104 by bolts 105. The bolts 105 also pass through flange adapter unions 118. Flange adapter unions 118 have threaded inlets which are connectable to threaded process pipes (not illustrated). Pressure flange 104 provides one or more process fluids pressures to the transmitter 100 for pressure measurement. Pressure transmitter 100 is connected to process loop 103 that energizes pressure transmitter 100 and provides bidirectional communication for use in a process control system.

Pressure sensor module housing 102 includes isolator diaphragms 110 (shown in FIG. 2) that are welded directly to pressure sensor module housing 102. Housing 102 also includes threaded bolt holes 112 in a standard pattern around isolator diaphragms 110.

Figure 2:
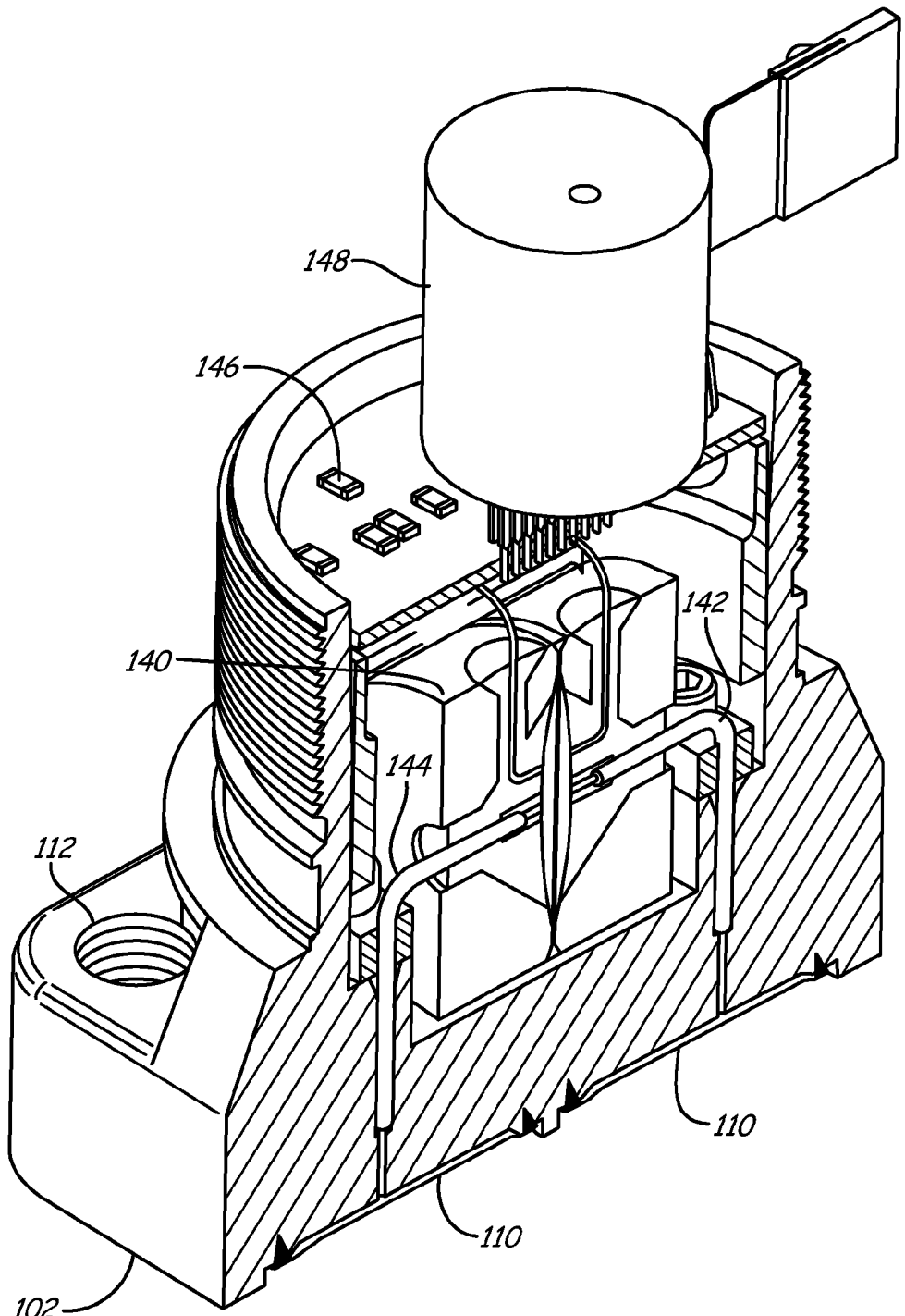
FIG. 2 illustrates an oblique sectional view of a module housing.

FIG. 2 illustrates an oblique sectional view of pressure sensor module housing 102. Differential pressure sensor 140 is located inside pressure sensor module housing 102 and connects, by tubes 142, 144, to isolator diaphragms 110. Isolator diaphragms 110 are welded directly to pressure sensor module housing 102. A circuit board 146 provides circuitry associated with processing electrical signals from differential pressure sensor 140. Flat cable reel 148 houses a flat cable that provides electrical connections from circuit board 146 to circuitry in an electronics housing (such as housing 101 shown in FIG. 1).

The coplanar pressure sensor module is a significant contributor to the overall cost of the final process fluid pressure transmitter. One of the reasons for such significant cost is that in order to provide such a robust part, the coplanar pressure sensor module is constructed from a complex stainless steel investment cast and machined part.

In accordance with embodiments of the present invention, the design constraints of each portion of the coplanar pressure sensor module are considered individually, and tailored for specific needs. While the overall assembly of a coplanar pressure sensor module in accordance with embodiments of the present invention may become more complex than prior art designs, such embodiments allow flexibility for different applications, and the ability to reduce costs on certain components, while potentially adding greater structural integrity to other components.

Figure 3:
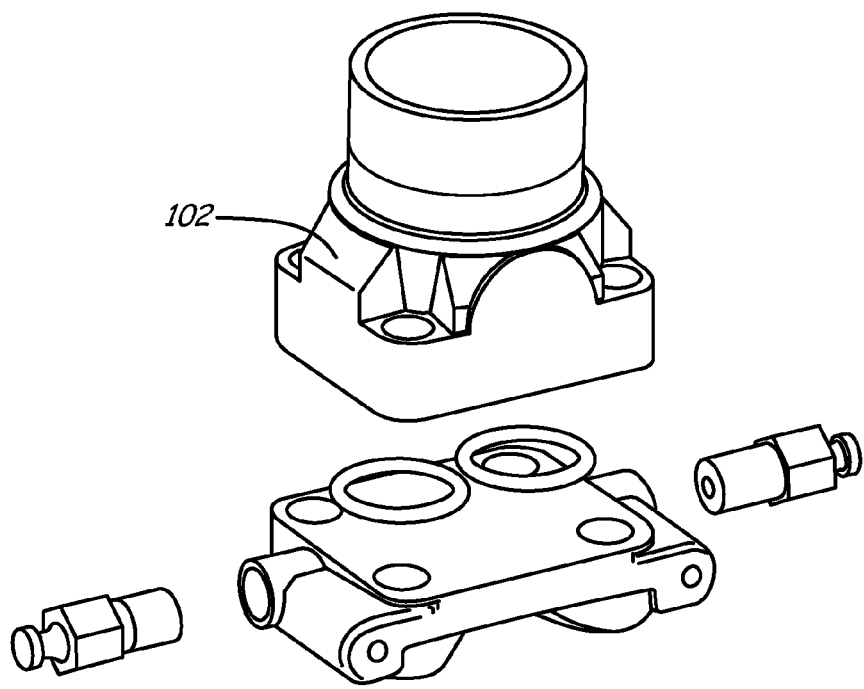
FIG. 3 is diagrammatic perspective view of a prior art coplanar pressure sensor module and a flange in accordance with the prior art.
Figure 4:
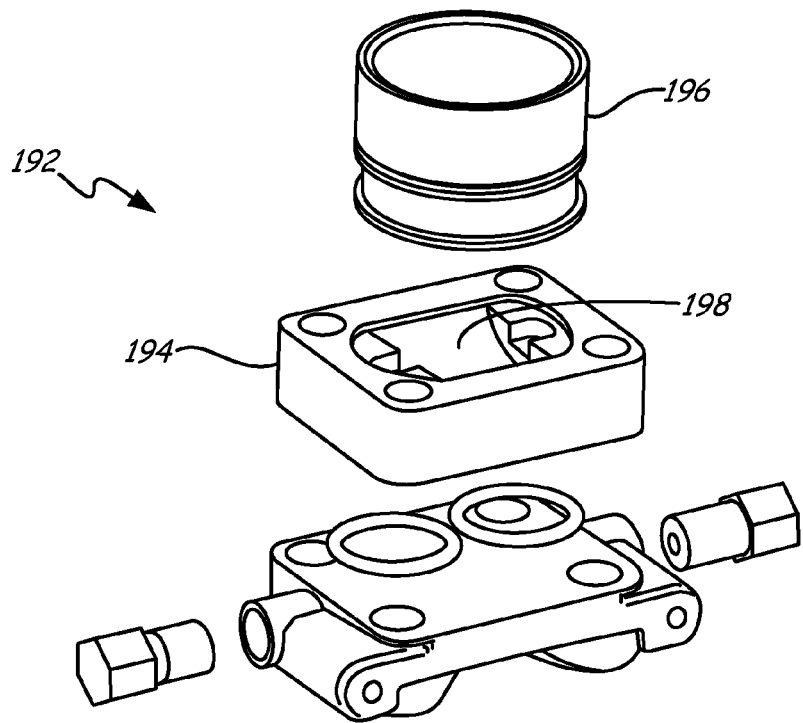
FIG. 4 illustrates an exploded diagrammatic perspective view of an improved coplanar pressure sensor module in accordance with the embodiments of the present invention.

FIG. 3 is diagrammatic perspective view of a prior art coplanar pressure sensor module and pressure flange in accordance with the prior art. As illustrated in FIG. 3, pressure sensor module 102 is a unitary investment cast stainless steel machined part. In contrast, FIG. 4 illustrates an exploded diagrammatic perspective view of an improved coplanar pressure sensor module in accordance with one embodiment of the present invention. In this embodiments, module 192 includes a plurality of components. Specifically, module 192 includes coplanar base 194 and housing 196. The housing 196 is preferably threaded. Coplanar base 194 and threaded housing 196 are joined together during module production and the finished assembly is visually similar to prior art coplanar pressure sensor module 102. Coplanar base 194 and housing body 196 meet at an interface. As used herein, an interface is intended to mean a point, line, plane or location where two different components meet. Coplanar base 194 may still be constructed from an investment cast, but it can also be forged or even cut from plate stock. Threaded housing body 196 can be cast, forged, drawn, screw machined, or constructed from pipe stock. According to one embodiment, coplanar base 194 and threaded housing body 196 may be constructed from different materials. This difference may be manifested in different grades of stainless steel, for example, coplanar base 194 may be constructed from 316 stainless steel, while threaded housing 196 may be constructed from 304 stainless steel or carbon steel. In embodiments where both components are constructed from the same basic material, such as stainless steel, the two components can be welded together, using a method such as TIG welding. However, embodiments of the present invention also include constructing threaded housing body 196 from a metal that is different than that used for the coplanar base, such as aluminum. In such embodiments, direct welding between a stainless steel coplanar base 194 and aluminum threaded housing body 196 is not practical. Instead, the two components are preferably mechanically fixed together using shrink fitting and swaging. Swaging is a well-known process that is used to change (reduce or enlarge) the diameter of tubes and/or pipes.

As illustrated in FIG. 2, differential pressure sensor 140 may be of the type that is generally of a cylindrical shape. In accordance with an embodiment of the present invention, coplanar base 194 may include a bowl or dish-shaped depression 198 that allows pressure sensor 140 to be positioned lower than prior art modules. This also reduces the overall height of the entire assembly and further reduces material costs. Smaller physical size generally provides the advantage of less material cost. In order to further reduce the size of coplanar pressure sensor module assembly 192, circuit board 146, which is normally provided within the pressure sensor module, can be removed completely and placed in the upper electronics housing 101. This allows the housing height to be reduced further. Such reductions in height and width enable utilization of thinner walls which reduces material costs further. In some embodiments, a temperature sensor can also be provided within the threaded housing body to help provide accurate temperature compensation for pressure.

Figure 5:
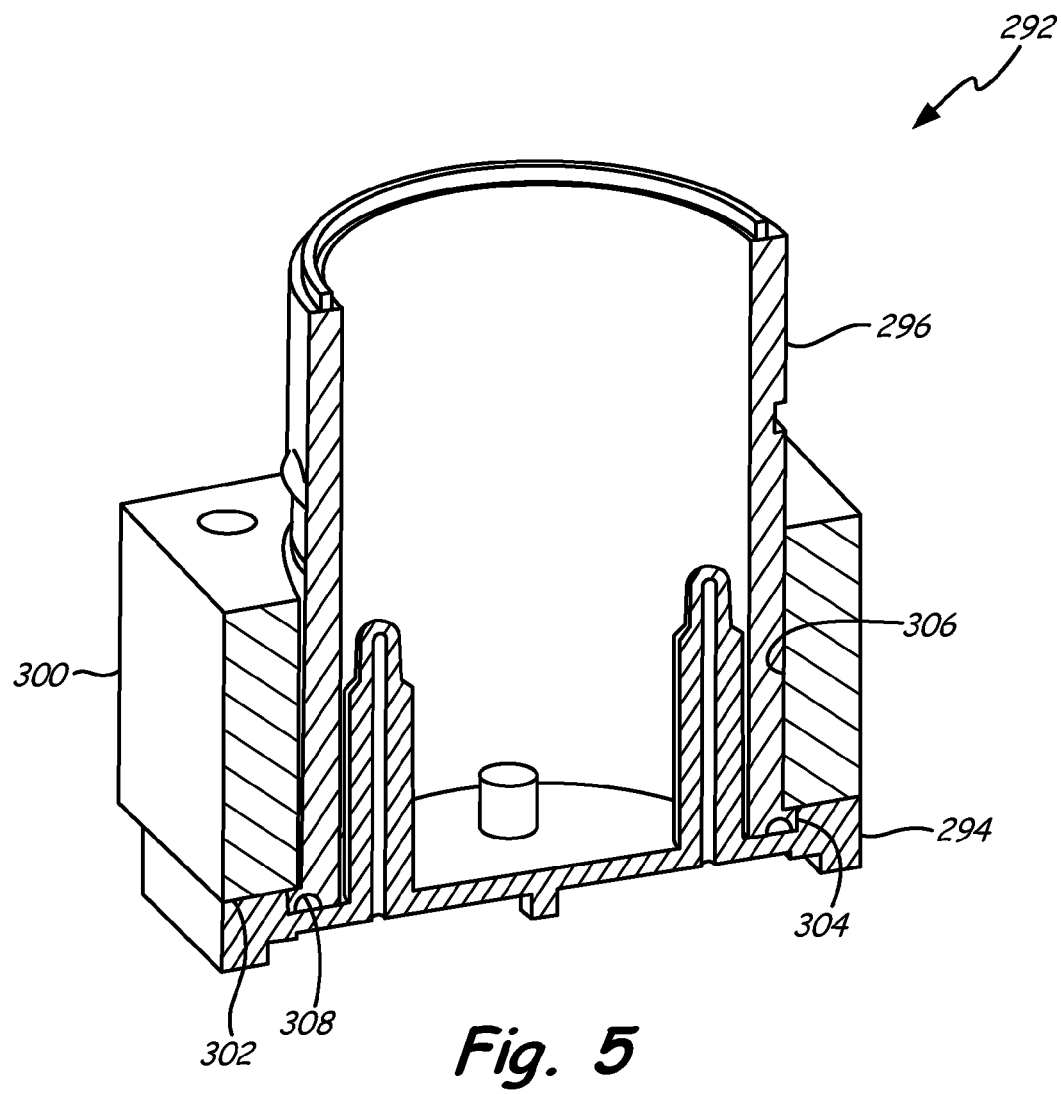
FIG. 5 is a cross sectional diagrammatic view of a coplanar pressure sensor module in accordance with another embodiment of the present invention.

FIG. 5 is a cross sectional diagrammatic view of a coplanar pressure sensor module in accordance with another embodiment of the present invention. Module 292 differs from module 192 (shown in FIG. 4) in that module 292 is constructed from three discrete components. Specifically, module 292 is constructed from coplanar base 294, tubular housing 296, and stiffener 300. In the embodiment illustrated in FIG. 5, the most complex portion of the assembly is coplanar base 294. Preferably, this component is made relatively thinner, when compared to coplanar base 194, and is formed using metal injection molding, or some other suitable technique that is adapted for the production of complex shapes and components. Due to its thinner construction, base 294 is generally not stiff enough to form a robust seal to a process flange on its own. Instead, stiffener plate 300 is provided which bears against coplanar base 294 at interface 302. Stiffener plate 300 includes a plurality of bolt holes which preferably allow assembly 292 to be mounted to a coplanar manifold in exactly the same manner as prior art designs. However, if specific product applications require extremely high pressures, such considerations can be accommodated by simply providing a stronger, or thicker stiffener plate 300.

Threaded housing body 296 preferably includes a lip 304 that is larger in diameter than aperture 306 through which tubular housing 296 passes. Thus, once stiffener plate 300 is secured in place, threaded housing body 296 is sandwiched between stiffener plate 300 and base plate 294. Threaded housing body 296 preferably includes an o-ring recess 308 which is configured to contain an elastomeric o-ring to seal threaded housing body 296 to coplanar base 294 when threaded housing body 296 is sandwiched between stiffener plate 300 and base plate 294.

Although the present invention has been described with reference to preferred embodiments, workers skilled in the art will recognize that changes may be made in form and detail without departing from the spirit and scope of the invention.

What is claimed is:

1. A coplanar process fluid pressure sensor module, the module comprising:
   a coplanar base having a pair of process fluid pressure inlets, each having an isolator diaphragm;
   a housing body coupled to the coplanar base at an interface between the coplanar base and the housing body; and
   a differential pressure sensor operably coupled to the pair of process fluid pressure inlets, and being disposed adjacent the coplanar base within the housing body; and
   a stiffener plate having an aperture through which the housing body passes, the stiffener plate configured to clamp the housing body between itself and the coplanar base.

2. The coplanar process fluid pressure sensor module of claim 1, wherein the coplanar base is formed of a first metal and the housing body is formed of a material different than the first metal.

3. The coplanar process fluid pressure sensor module of claim 2, wherein the housing body is formed of a different grade of material than the first metal.

4. The coplanar process fluid pressure sensor module of claim 3, wherein the first metal is stainless steel.

5. The coplanar process fluid pressure sensor module of claim 4, wherein the coplanar base and the housing body are coupled at the interface by a weld.

6. The coplanar process fluid pressure sensor module of claim 2, wherein the housing body is formed of a different metal than the first metal.

7. The coplanar process fluid pressure sensor module of claim 6, wherein the different material is aluminum.

8. The coplanar process fluid pressure sensor module of claim 6, wherein the coplanar base is coupled to the housing body at the interface via a shrink fit.

9. The coplanar process fluid pressure sensor module of claim 6, wherein the coplanar base is coupled to the housing body at the interface by swaging.

10. The coplanar process fluid pressure sensor module of claim 2, wherein the coplanar base includes a recess configured to receive the differential pressure sensor.

11. The coplanar process fluid pressure sensor module of claim 2, wherein the coplanar base is formed using metal injection molding.

12. The coplanar process fluid pressure sensor module of claim 2, wherein the housing body is fanned from casting.

13. The coplanar process fluid pressure sensor module of claim 2, wherein the housing body is forged.

14. The coplanar process fluid pressure sensor module of claim 2, wherein the housing body is drawn.

15. The coplanar process fluid pressure sensor module of claim 2, wherein the housing body is screw machined.

16. The coplanar process fluid pressure sensor module of claim 2, wherein the housing body is formed from pipe stock.

17. The coplanar process fluid pressure sensor module of claim 1, wherein the housing body includes a lip having a diameter greater than the aperture.

18. The coplanar process fluid pressure sensor module of claim 1, wherein the housing body includes an o-ring surface to maintain an o-ring therein.

19. The coplanar process fluid pressure sensor module of claim 1, wherein the differential pressure sensor is coupled directly to a circuit board disposed in an electronics housing separate from the housing body.

20. The coplanar process fluid pressure sensor module of claim 1, and further comprising a temperature sensor disposed within the housing body.

21. A coplanar process fluid pressure sensor module, the module comprising:

a steel coplanar base having a pair of process fluid pressure inlets, each having an isolator diaphragm;

a cylindrical housing body coupled to the coplanar base at an interface between the steel coplanar base and the housing body, the cylindrical housing body having an externally threaded portion;

a differential pressure sensor operably coupled to the pair of process fluid pressure inlets, and being disposed proximate the coplanar base within the housing body; and a stiffener plate having an aperture through which the housing body passes, the stiffener plate configured clamp the housing between itself and the coplanar base.

22. The coplanar process fluid pressure sensor module of claim 21, wherein the cylindrical housing body is also formed of steel and is welded to the steel coplanar base.

23. The coplanar process fluid pressure sensor module of claim 21, wherein the cylindrical housing body is formed of a different material than the steel coplanar base.

24. The coplanar process fluid pressure sensor module of claim 23, wherein the cylindrical housing body is coupled to the steel coplanar base by swaging.

* * * * *